(12) United States Patent
Delpierre, III et al.

(10) Patent No.: US 6,349,634 B1
(45) Date of Patent: Feb. 26, 2002

(54) GRILL WITH IMPROVED ROTARY HEATING ELEMENTS

(75) Inventors: Phillip Delpierre, III, Gurnee; Walter Edward Howard, Libertyville, both of IL (US)

(73) Assignee: Kraft Foods, Inc., Northfield, IL (US)

( * ) Notice: Subject to any disclaimer, the term of this patent is extended or adjusted under 35 U.S.C. 154(b) by 0 days.

(21) Appl. No.: 09/401,162

(22) Filed: Sep. 22, 1999

(51) Int. Cl.[7] ................................................ A47J 37/04
(52) U.S. Cl. ............................ 99/441; 99/426; 99/427
(58) Field of Search ...................... 99/426, 441, 427, 99/443 R, 448, 409, 388, 386, 373

(56) References Cited

U.S. PATENT DOCUMENTS

| 2,185,979 A | 1/1940 | Dumas |
| 2,253,434 A | 8/1941 | Kernick |
| 2,966,841 A | 1/1961 | Jigamian |
| 3,472,156 A | * 10/1969 | Bardeau et al. ................ 99/441 |
| 5,355,778 A | 10/1994 | Mayfield et al. |
| 5,445,064 A | * 8/1995 | Lopata ......................... 99/421 |

FOREIGN PATENT DOCUMENTS

FR   1477759   3/1966

* cited by examiner

*Primary Examiner*—Curtis E. Sherrer
*Assistant Examiner*—Hao Mai
(74) *Attorney, Agent, or Firm*—Fitch, Even, Tabin & Flannery

(57) ABSTRACT

An improvement to a grill wherein the affective radius of a rotary heating element is locally varied to improve engagement and rotation of a food items, including next generation dough involved food items and the like, on the grill. Attachments for retrofitting of existing, commercially available grills, and methods of using the improved grills are disclosed.

4 Claims, 2 Drawing Sheets

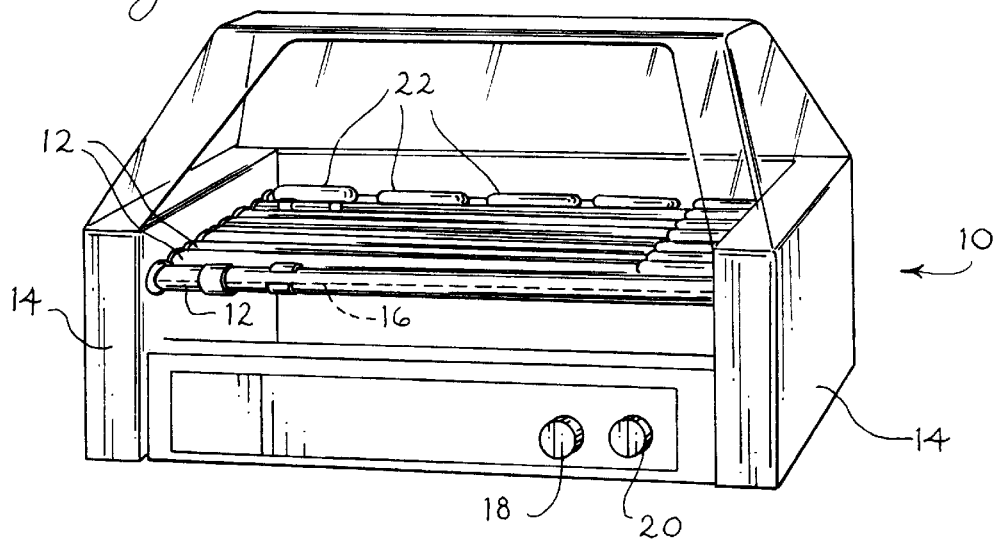
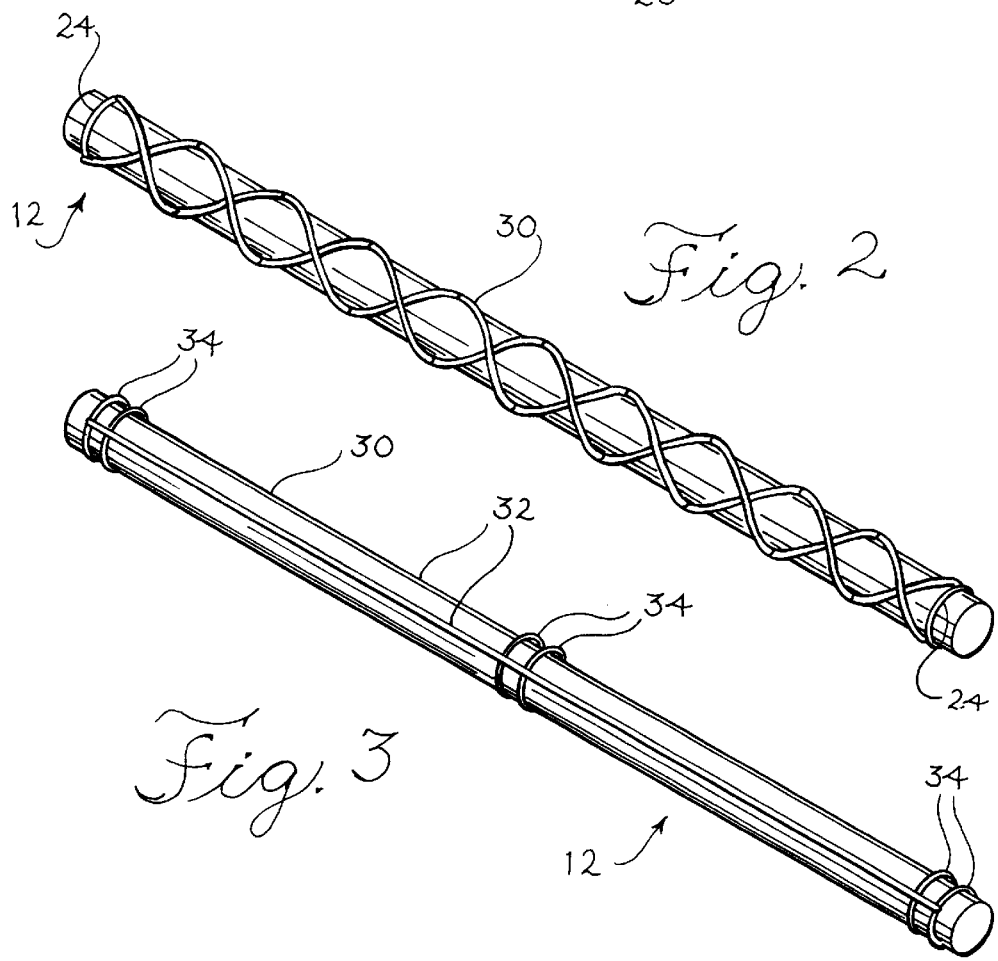

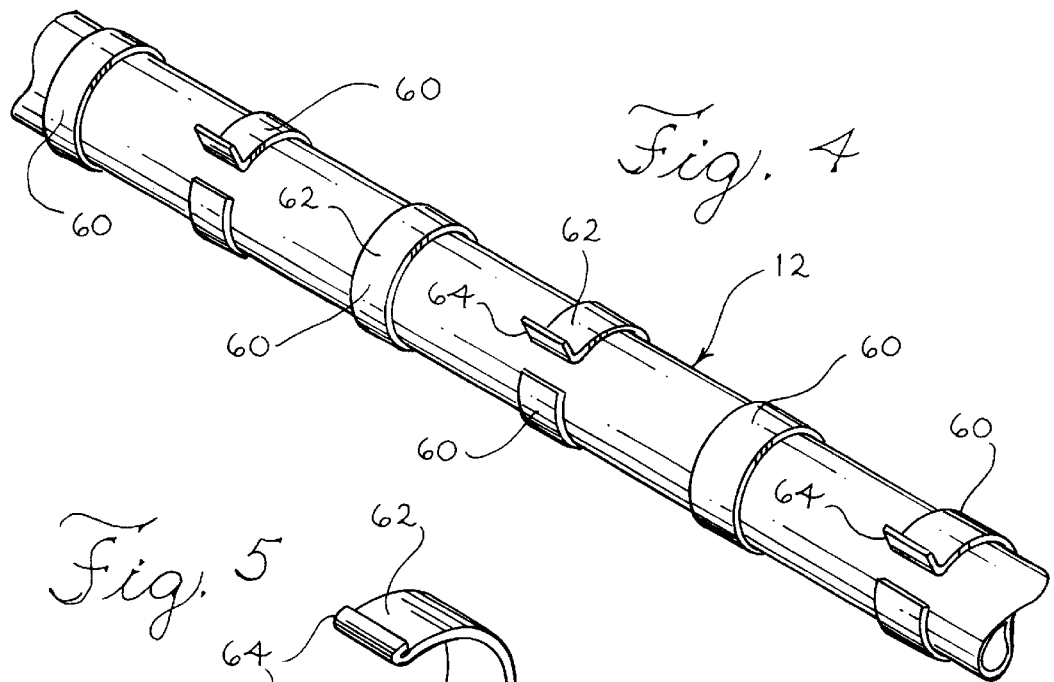
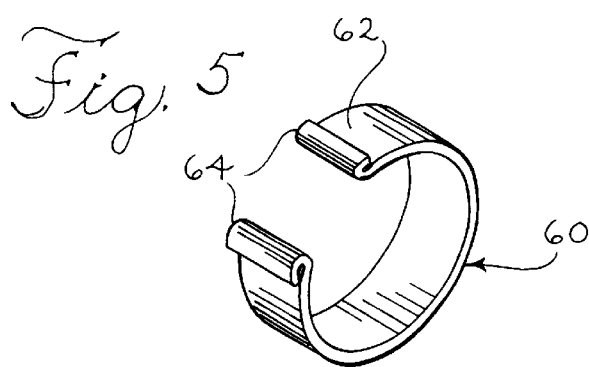
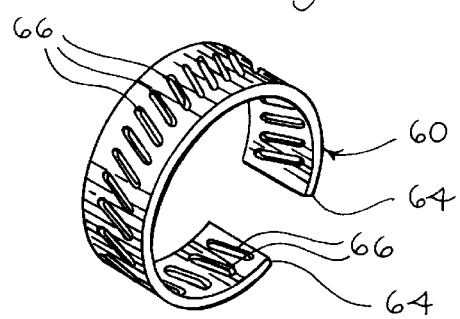
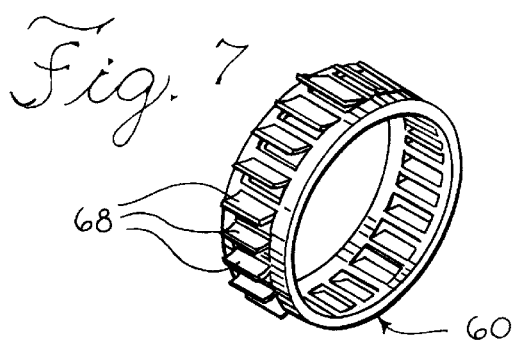
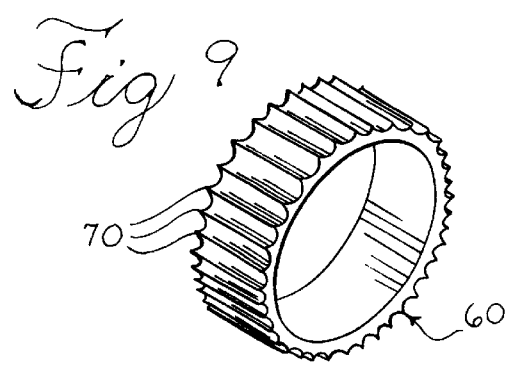
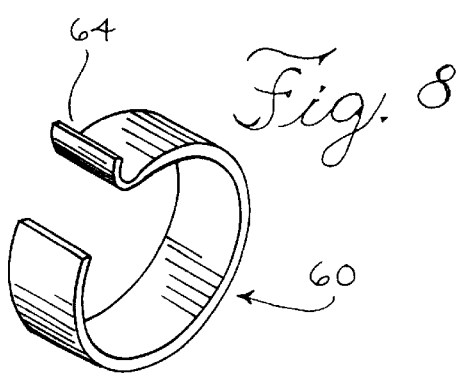

… (US 6,349,634 B1)

GRILL WITH IMPROVED ROTARY HEATING ELEMENTS

BACKGROUND OF THE INVENTION

1. Field of the Invention

The invention relates generally to equipment for heating food products, and more particularly to an improved grill of the type having rotary heating elements.

2. Description of Related Art

Grills having cylindrical rotary heating elements are utilized in convenience store locations and other food service environments to heat products such as hot dogs, sausages, etc. The food products are rotated about their longitudinal axes on the rotary heating elements. The rotary heating elements, or rollers, are typically arranged parallel to one another and closely spaced in a horizontal array, and are driven to rotate at the same angular velocity. The rollers have internal heating elements thermally coupled to their external food-engaging surfaces. The rollers may have thermally conductive non-stick coatings of PTFE or other materials. Each food item is supported by a pair of adjacent rollers. One example of the prior art in this field is U.S. Pat. No. 2,185,979.

In order for products to roll and heat properly on prior art grills of this type, the food products must be substantially cylindrical in shape. Certain items, such as hot dog buns and next generation products currently under development (including dough enrobed, or wrapped products) can experience difficulty rolling on the grill. This may be due to the overall shape of the product, inconsistencies in the shape of the product, or imperfections (i.e., seams, blisters, etc.) in the outer surface of the food product. In addition, products that are cylindrical but of large or small diameter may not roll properly due to the angle of contact of product to roller, or the ratio of product size to contact surface with the roller. Products that do not roll properly will not heat uniformly, and will burn at higher grill temperatures. It is a general object of the invention to provide a commercially viable grill of the type having rotary heating elements wherein the grill is capable of evenly heating problematic products such as those mentioned above, as well as products that have commonly been heated on grills of this type in the past, without burning or otherwise damaging the food products.

SUMMARY OF THE INVENTION

The invention provides an improved grill of the type having rotary heating elements, and a method of modifying a grill of this type to enable substantially uniform heating of food items that heretofore could not reliably be heated uniformly on grills of this type.

The grill preferably comprises a plurality of rollers disposed closely spaced in a generally horizontal array substantially parallel to one another and rotating generally in the same rotational direction. Each roller has an external heating surface and at least one internal heating element thermally coupled to the external heating surface to transfer heat to a food product in contact with the external heating surface.

In accordance with the invention, the grill preferably further includes engagement means for improving engagement between at least one of the rollers and the food product in contact therewith by providing a locally varied effective radius of the external heating surface along a segment of the roller. The engagement means preferably is in direct contact with the external heating surface to provide heat transfer to the food product through the engagement means. In one embodiment, the engagement means comprises a grid of helically disposed wire. In a second embodiment, the engagement means provides a grid of longitudinally and circumferentially disposed wire. In additional embodiments, the invention comprises circumferential bands of various configurations.

The engagement means may comprise removable attachments which can be retrofitted on rollers and which may be readily removed therefrom to facilitate cleaning. The removable attachments preferably are capable of installation without any disassembly of the grill. The removable attachments may comprise resilient, generally C-shaped bands that snap on to the rollers. In other embodiments, the engagement means may be integral with the external surface of the roller in a one-piece unitary structure. The engagement means may include teeth, ribs, or other projections, or a plurality of slots, indentations or the like.

One of the problems encountered in configuring the engagement means is that, with certain configurations and angular velocities, the engagement means on one roller may cause the food item to be displaced from its desired position. The engagement means preferably is configured to avoid this problem. Also, the engagement means preferably does not contact adjacent rollers or engagement means thereon.

The improved grill may be employed for uniform heating of food products such as hot dogs, sausages, buns, ears of corn, carrots and other items of generally cylindrical configuration.

BRIEF DESCRIPTION OF THE DRAWINGS

FIG. 1 is a perspective view of a grill in accordance with an embodiment of the invention.

FIG. 2 is a longitudinal view of a rotary heating element modified by attachment of a helical grid of wires about its exterior.

FIG. 3 is a longitudinal view of a rotary heating element modified by affixing wires parallel to its axis along its exterior surface.

FIG. 4 is a longitudinal view of a rotary heating element modified by affixing circumferential bands about its exterior.

FIGS. 5–9 are perspective views of circumferential bands in accordance with additional embodiments of the invention.

DESCRIPTION OF THE PREFERRED EMBODIMENTS

The preferred embodiment of the invention include grills having attachments on their rollers for engaging food items, and methods of retrofitting existing grills with such attachments to enhance their ability to rotate and uniformly heat articles of food without localized burning or other damage to the food articles. The invention may also be embodied in methods of cooking articles of food using the modified rollers of the invention. Although the preferred embodiments described herein include attachments to the rollers, in other embodiments the rollers may include means for positively engaging food items as integral components, rather than attachments. In either case, slippage between the food items and the rollers is substantially reduced or eliminated so that the food items may be rotated reliably, without dislocation of the food item from between its associated pair of rollers. Where attachments are employed, they may be permanently affixed to the rollers, or may be removable.

A grill embodying the invention is shown in FIG. 1 at 10. The grill 10 includes a plurality of rollers 12 which are supported for rotation at their end by side walls 14. Each of the rollers has an essentially cylindrical exterior surface. They are engaged by a drive mechanism in one of the side walls which rotates them about their axes, such that the rollers all rotate in the same direction. Each roller has at least one internal heating element 16 thermally coupled to the external surface of the roller. The heating element may be an electric resistive heating element. Controls 18 and 20 are provided for the heating elements and the drive mechanism. Each food item 22 engages two adjacent rollers, and is impelled to rotate opposite to the direction of rotation of the rollers.

FIGS. 2, 3, and 4 present longitudinal exterior views of a roller 12 modified according to various embodiments of the invention. In the embodiment shown in FIG. 2, wires 30 are affixed to the roller 20 in a helical grid such that each wire describes a helical path along the exterior surface of the cylindrical roller. An equal number of wires describing a right-handed helix as those describing a left-handed helix are affixed to the surface. The wires may be welded or bonded to the roller, and/or maybe anchored by binding them to rings 24 (FIG. 2) that extend around the roller at each end of the grid. The grid may have a generally cylindrical shape so extend about the entire circumference of the roller over substantially the entire length thereof. The wire is preferably disposed in contact with the surface of the roller to facilitate heat transfer from the roller to the food item through the wire. The wires 30 may be made of any suitable noncorroding, nontoxic metal or metal alloy, such as stainless steel or aluminum, or may be of a suitable food grade plastic. Wire of any suitable diameter may be employed. In one embodiment, 24 gauge wire is employed.

In the embodiment of FIG. 3, a grid is provided by longitudinal wire segments 32 and circumferential wire segments 34. Three pair of circumferential segments 34 are shown in FIG. 3, but more or fewer may be employed. As in the embodiment of FIG. 2, the wire grid is preferably in direct contact with the roller, thermally coupled thereto, and may be of any suitable diameter.

FIG. 4 shows a third embodiment of the invention wherein a roller 12 is fitted with a plurality of annular bands 60 circumferentially fitted to the roller. Each annular band preferably includes a resilient material biased to grip the roller about a circumferential zone of the roller. When used for retrofitting of a grill, the band should be sufficiently resilient to be capable of opening enough to fit over the roller without being permanently deformed. This enables installation of the bands 60 without any disassembly of the grill. The band preferably is sufficiently resilient that it recovers its original profile and maintains a tight grip on the roller surface after installation. In the illustrated embodiments, the band 60 encompasses more than a semicircle, engaging more than 180 degrees of the roller circumference, so that it may be held in place only by its grip on the roller. In other embodiments, the band may be welded or otherwise bonded to the roller, and may have a circumferential dimension of less than 180 degrees. The band preferably extends a short distance parallel to the cylinder axis, along the cylindrical surface.

FIGS. 5–9 illustrate bands 60 in accordance with additional embodiments of the invention. The bands of FIGS. 5–9 are intended to be attached to rollers in a configuration generally similar to that illustrated in FIG. 4, preferably spaced so that at least two of the bands engage each food product on the grill.

In the embodiment of FIG. 4, the band has a generally arcuate outer surface 62, interrupted by an upturned end 64 of the band. In FIG. 5, the band 60 similarly has a substantially arcuate outer surface 62 but both ends 64 of the band are upturned and folded back on themselves, so as to provide a pair of radial protrusions for positive engagement with an article of food. The folded end portions may be filled and/or sealed to prevent possible retention of food or other matter within the folded end portions. Alternatively, the bands may be formed with solid, enlarged end portions that do not incorporate a fold, and do not have cavities or other openings that might present food retention issues.

The band 60 of FIG. 6 is generally similar to that of FIG. 5, except that, rather than having enlarged end portions, the band has a plurality of slots 66 formed therein to engage and rotate a food product. In the illustrated embodiment, each of the slots is somewhat skewed with respect to the axis of the band, and has an elongated configuration with rounded ends. In addition to the slots, the ends 64 of the band, although not enlarged, will also facilitate engagement and rotation of a food product.

FIG. 7 illustrates an embodiment wherein the band 60 has an annular configuration, extending 360 degrees about the roller, with a plurality of rectangular tabs 68 cut from the band and bent upward to extend outward therefrom.

FIG. 8 illustrates an embodiment wherein the band is similar to that of the embodiment of FIG. 4, in that one end 62 of the band is bent upward to extend radially outward to engage the food product, except that in the embodiment of FIG. 8, a larger radius of curvature is employed at the bend.

FIG. 9 illustrates an embodiment wherein a 360 degree band is provided with uniformly spaced teeth 70 at a relatively narrow pitch about its entire 360 degree exterior. Each of the teeth has a radial outer extremity that comprises an axial ridge.

The embodiments wherein the band has a C-shaped configuration may be modified so that the band extends 360 degrees about the roller, and, conversely, the embodiment in which the band extends 360 degrees about the roller, e.g., the embodiments of FIGS. 7 and 9, might be modified so that the band extends in a C-shaped configuration, less than 360 degrees about the circumference of the roller.

It is believed that the invention will be useful in commercial food preparation environments for heating the types of products that have been heated on grills with rotary heating elements in the past, as well as products such as hot dog buns, ears of corn, carrots, etc. that have been difficult or impossible to heat uniformly on conventional grills of this type. The invention is also expected to be useful for heating next generation products such as dough-enrobed products having an outer layer of dough surrounding a filling of, e.g., cheese, ham, peppers, sausage, or other food items, alone or in combination. The improved grill may be employed to heat frozen or refrigerated products from an initial temperature of, e.g., 20 to 45 degrees F. to serving temperatures between 130 and 160 degrees F., e.g., about 140 degrees F. over a period of about 30 minutes, then maintaining the products for, e.g., another 60 or more minutes without localized overheating, burning, excessive drying, or other damage to the products. The improved grill of the invention would, of course, also be useful for heating room-temperature products to an elevated serving temperature. The methods of cooking with improved grills according to the invention may include applying cooking spray (such as oil, lecithin, or the like) to the food products before or during heating on the grill to maintain desirable surface texture and appearance.

From the foregoing, it should be appreciated that the invention provides a novel and improved grill, along with novel and improved methods of cooking heating food products on a grill. In addition, the invention encompasses methods of retrofitting a grill with attachments to improve the capability of the grill to rotate noncylindrical food products.

The invention is not limited to the embodiments described above, or to any particular embodiments. The attachments described herein may be made of any suitable metal, food grade plastic, or other material. The attachments may be permanently affixed to the rollers, or may be removable. If desired, the attachments may be made of an inexpensive material so as to be disposable. The invention is further described and pointed out in the following claims.

We claim:

1. In a grill for heating rotatable food items, said grill comprising a plurality of rollers disposed in an array and rotating in the same rotational direction, each roller having an external heating surface and at least one internal heating element thermally coupled to said external heating surface to transfer heat to a food item in contact with a pair of rollers, the improvement comprising:

a grid of helically disposed wire for improving engagement between at least one of said rollers and a food item in contact therewith, wherein the grid of helically disposed wire is in direct contact with said external heating surface to provide heat transfer to the food item through said grid of helically disposed wire along at least a segment of said roller, and wherein said grid of helically disposed wire being effective to reliably rotate the food item without dislocating the food item from said pair of rollers.

2. In a grill for heating rotatable food items, said grill comprising a plurality of rollers disposed in an array and rotating in the same rotational direction, each roller having an external heating surface and at least one internal heating element thermally coupled to said external heating surface to transfer heat to a food item in contact with a pair of rollers, the improvement comprising:

a grid of longitudinally and circumferentially disposed wire for improving engagement between at least one of said rollers and a food item in contact therewith, wherein the grid of longitudinally and circumferentially disposed wire is in direct contact with said external heating surface to provide heat transfer to the food item through said grid of longitudinally and circumferentially disposed wire along at least a segment of said roller, and wherein said grid of longitudinally and circumferentially disposed wire being effective to reliably rotate the food item without dislocating the food item from said pair of rollers.

3. In a grill for heating rotatable food items, said grill comprising a plurality of rollers disposed in an array and rotating in the same rotational direction, each roller having an external heating surface and at least one internal heating element thermally coupled to said external heating surface to transfer heat to a food item in contact with a pair of rollers, the improvement comprising:

a resilient, generally C-shaped band for improving engagement between at least one of said rollers and a food item in contact therewith, wherein the resilient, generally C-shaped band is in direct contact with said external heating surface to provide heat transfer to the food item through said resilient, generally C-shaped band along at least a segment of said roller, and wherein said resilient, generally C-shaped band being effective to reliably rotate the food item without dislocating the food item from said pair of rollers.

4. The improvement of claim 3 wherein said C-shaped band comprises a removable attachment which may be retrofitted on a roller and may be readily removed therefrom to facilitate cleaning of the roller.

* * * * *